United States Patent
Verma et al.

(10) Patent No.: US 11,571,815 B2
(45) Date of Patent: Feb. 7, 2023

(54) SAFETY CONTROL MODULE FOR A ROBOT ASSEMBLY AND METHOD OF SAME

(71) Applicant: MAGNA INTERNATIONAL INC., Aurora (CA)

(72) Inventors: Rajeev Verma, Troy, MI (US); Alexander Zak, Troy, MI (US); Rahul Meka, Rochester Hills, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 41 days.

(21) Appl. No.: 16/955,864

(22) PCT Filed: Dec. 21, 2018

(86) PCT No.: PCT/US2018/067113
§ 371 (c)(1),
(2) Date: Jun. 19, 2020

(87) PCT Pub. No.: WO2019/126657
PCT Pub. Date: Jun. 27, 2019

(65) Prior Publication Data
US 2020/0391386 A1    Dec. 17, 2020

Related U.S. Application Data

(60) Provisional application No. 62/608,915, filed on Dec. 21, 2017.

(51) Int. Cl.
*B25J 9/16*    (2006.01)
*B60W 60/00*    (2020.01)
(Continued)

(52) U.S. Cl.
CPC ............ *B25J 9/1676* (2013.01); *B60W 30/09* (2013.01); *B60W 30/095* (2013.01);
(Continued)

(58) Field of Classification Search
CPC .. B25J 9/1676; B25J 5/00; B25J 5/02; B60W 30/09; B60W 30/095; B60W 60/0011;
(Continued)

(56) References Cited

U.S. PATENT DOCUMENTS 5,652,489 A * 7/1997 Kawakami ........... G05D 1/0274
901/3
9,694,497 B2    7/2017 Burmeister et al.
(Continued)

FOREIGN PATENT DOCUMENTS

WO    2017163251    9/2017

OTHER PUBLICATIONS

Extended European Search Report for EP 18891542.5 dated Aug. 5, 2021, 12 Pages.
(Continued)

*Primary Examiner* — Abby Y Lin
*Assistant Examiner* — Danielle Marie Jackson
(74) *Attorney, Agent, or Firm* — Dickinson Wright PLLC

(57) ABSTRACT

A robot assembly for safe operation in a manufacturing setting with humans including a sensor for detecting a human location and human movement is provided. A safety control module providing a boundary of a safety zone area that is associated with the human in a task oriented state that includes a largest possible area in which the human or an associated work object can extend when the human is standing in one location and performing the work task. The human movement and safety zone area location being used to develop a capture set area that includes at least one predictive future safety zone area location. Using the at least one predicted future safety zone area, establishing a travel path for moving the robot between locations without overlapping the capture set area.

15 Claims, 6 Drawing Sheets

(51) Int. Cl.
*B60W 30/09* (2012.01)
*B60W 30/095* (2012.01)
*G05D 1/02* (2020.01)
*F16P 3/14* (2006.01)

(52) U.S. Cl.
CPC ............ *B60W 60/0011* (2020.02); *F16P 3/14* (2013.01); *G05D 1/0214* (2013.01); *F16P 3/141* (2013.01)

(58) Field of Classification Search
CPC ... F16P 3/14; F16P 3/141; F16P 3/144; G05D 1/0214; G05D 2201/0216; G05D 1/0282; G05B 2219/40203; G05B 2219/40298
See application file for complete search history.

(56) References Cited

U.S. PATENT DOCUMENTS

| | | | |
|---|---|---|---|
| 2008/0033649 A1 | 2/2008 | Hasegawa et al. | |
| 2008/0040040 A1 | 2/2008 | Goto et al. | |
| 2009/0043440 A1 | 2/2009 | Matsukawa et al. | |
| 2010/0222925 A1* | 9/2010 | Anezaki | G05D 1/0253 700/253 |
| 2015/0294496 A1 | 10/2015 | Medasani et al. | |
| 2016/0063727 A1* | 3/2016 | Gao | G06V 20/52 382/103 |
| 2016/0075023 A1 | 3/2016 | Sisbot et al. | |
| 2016/0299509 A1 | 10/2016 | Ueda et al. | |
| 2017/0080565 A1 | 3/2017 | Dalibard et al. | |
| 2017/0144307 A1* | 5/2017 | Rublee | B25J 9/1676 |
| 2017/0214902 A1* | 7/2017 | Braune | G06T 7/50 |
| 2018/0072212 A1* | 3/2018 | Alfaro | B60K 7/0007 |
| 2018/0222052 A1* | 8/2018 | Vu | B25J 9/1666 |
| 2018/0246512 A1* | 8/2018 | Martinson | G05D 1/0274 |
| 2018/0333869 A1* | 11/2018 | Ding | B25J 19/026 |

OTHER PUBLICATIONS

Gil et al. "A Cooperative robotic system based on multiple sensors to construct metallic structures." The International Journal of Advanced Manufacturing Technology 2009, vol. 45, No. 5-6, pp. 616-630.

Oli et al. "Human Motion Behaviour Aware Planner (HMBAP) for path planning in dynamic human environments." 16th International Conference on Advanced Robotics (ICAR) 2013, 7 Pages.

Corrales et al. "Safe human-robot interaction based on dynamic sphere-swept line bounding volumes." Robotics and computer intergrated manufacturing 2011, vol. 27, No. 1, pp. 177-185.

Khambhaita et al. "Assessing the social criteria for human-robot collabroative navigation: A comparison of human-aware navigation planners." 26th IEEE International Symposium on Robot and Human Interactive Communication 2017, pp. 1140-1145.

\* cited by examiner

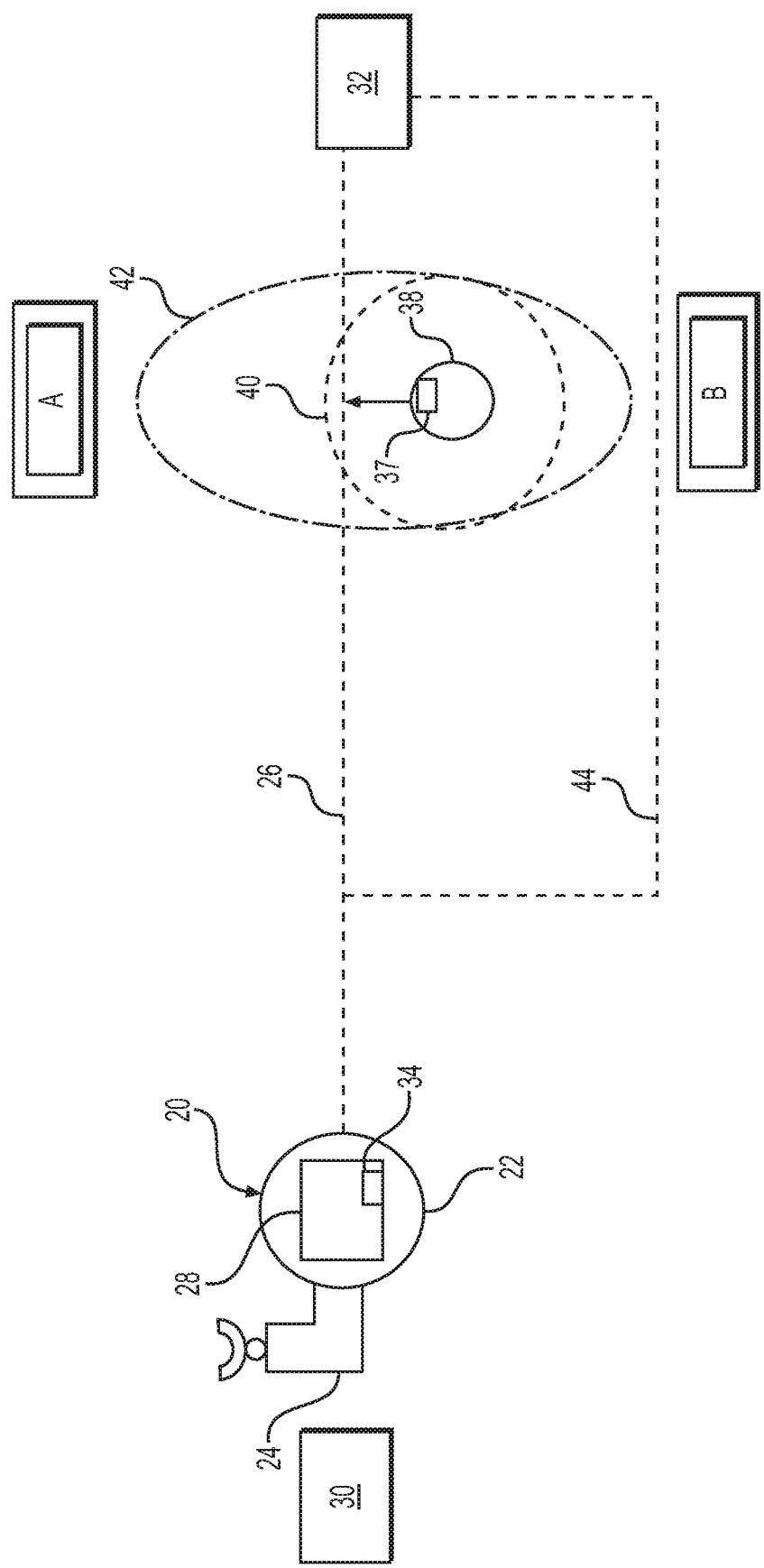

SAFETY CONTROL MODULE FOR A ROBOT ASSEMBLY AND METHOD OF SAME

CROSS-REFERENCE TO RELATED APPLICATIONS

This U.S. National Stage Patent Application claims the benefit of PCT International Patent Application Serial No. PCT/US2018/067113 filed Dec. 21, 2018 entitled "Safety Control Module For A Robot Assembly And Method Of Same" which claims the benefit of and priority to U.S. Provisional Patent Application Ser. No. 62/608,915 filed on Dec. 21, 2017, and titled "Safety Control Module For A Robot Assembly And Method Of Same", the entire disclosure of which is hereby incorporated by reference.

BACKGROUND OF THE INVENTION

1. Field of the Invention

The present invention relates to robots in manufacturing environment. More particularly, the present invention relates to safety features for robots used in a manufacturing environment with proximate humans.

2. Related Art

This section provides background information related to the present disclosure which is not necessarily prior art.

As productivity and efficiency are the goals in any manufacturing environment, robots are being utilized, now more than ever, for a greater number of tasks. Conventional robots are known to weld, assemble, and move workpieces between locations, whereas humans typically perform more complicated tasks that require recognition of several types of objects. However, modern robots are now being programmed to perform more and more advanced tasks similar to those of a human. While there is typically some overlap between an area in which a robot is operating and an area in which a human is working, these advanced tasks often times place robots in close confines with humans. The major concern of introducing robots to a manufacturing environment where humans are working is safety. Specifically, the concern is that a robot's movement and a human's movement will intersect; causing a collision that ultimately harms the human or damages the robot. The main goal of using robots is productivity that, in theory, will recoup the large initial cost of buying the robots. Productivity requires these robots to perform tasks quickly, but the faster a robot performs a task, the higher the magnitude of potential harm to both the robot and the human during a collision. As is often times the case, an attempt to create a safer setting for humans detrimentally affects productivity.

Various strategies have been employed to create safer manufacturing environments. One strategy is to create a physical barrier around an area in which the robot operates so that a human must remain a safe distance away. This method, while simple, requires additional space in the manufacturing environment and is generally over restrictive, particularly for robots that move between locations.

All of these strategies slow productivity and are not guaranteed to avoid collision with a human, particularly a human that is moving. Moreover, even when a human is standing in one place, their upper body or a carried object will move as required for that given task creating an area of risk beyond what is anticipated. Accordingly, there exists a need to advance the art such that neither safety nor productivity must suffer.

SUMMARY OF THE INVENTION

According to one aspect of the invention, the disclosure provides method for operating a robot assembly to prevent collision with a human in a manufacturing setting. The method includes providing a robot assembly with a safety control module. Next, a human location determined with a sensor and that information is transmitted to the safety control module. The safety control module then determines at least one safety zone area to avoid. The safety zone area corresponds to a work task assigned to the human that includes the area that the human or an associated work object could extend when the human is standing in one location and performing the work task. The method further includes preventing the robot assembly from moving within the safety zone area.

According to another aspect of the invention, the disclosure provides a robot assembly comprising a C.P.U. that includes one or more computer-readable storage media storing computer-executable instructions being executed by one or more processors. A sensor detects a human location and human movement and transmits information to the robot assembly. The robot assembly further comprises a safety control module that includes a human location data and a safety zone data transmitted from the sensor. The human location data being associated with a location of a human. The safety zone data providing a boundary of a safety zone area that is associated with the human in a task oriented state and that includes a largest possible area in which the human or an associated work object can extend when the human is standing in one location and performing the work task. The processor uses the safety zone data to avoid moving the robot assembly into the safety zone area.

According to yet another aspect of the invention, the disclosure provides developing a capture set area that includes at least one predicted future safety zone area based on movement of the safety zone area as a function of time. A travel path of the robot assembly is developed such that movement of the robot assembly is directed to the most efficient route that bypasses the capture set area.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 2A is a top view illustrating a manufacturing setting wherein a robot assembly with a moveable base determines a capture set over an extended time interval;

DESCRIPTION OF THE ENABLING EMBODIMENT

Example embodiments will now be described more fully with reference to the accompanying drawings. In general, the subject embodiments are directed to a robot assembly with a safety control module and method of operation. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views and charts, the robot assembly with the safety control module and method of operation is intended for preventing collision between robots and humans while maintaining robot efficiency and productivity in a manufacturing environment.

Figure 1:
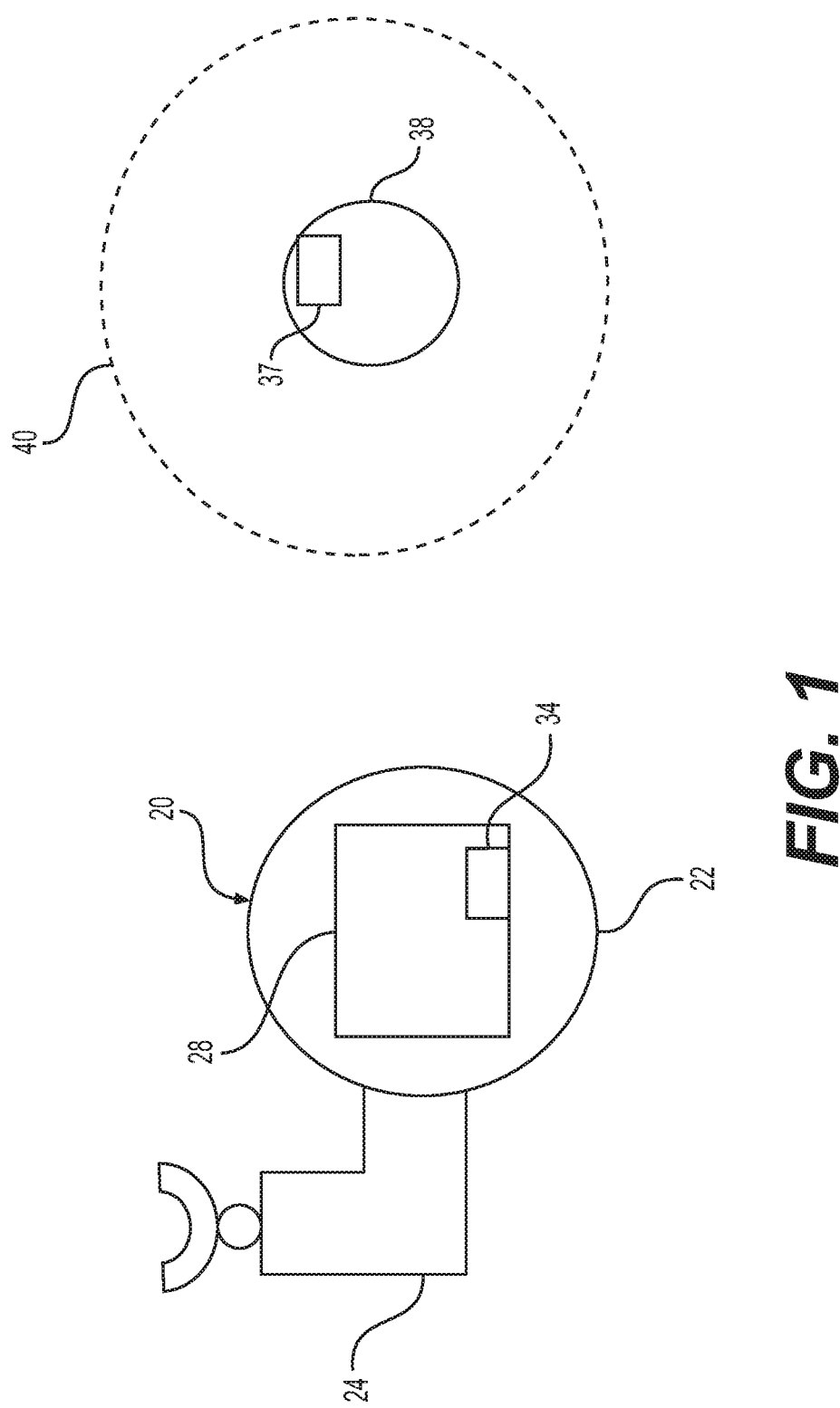
FIG. 1 is a top view illustrating a manufacturing setting wherein a robot assembly determines a human location and a safety zone.

With Reference initially to FIG. 1, a robot assembly 20 is shown. The robot assembly 20 includes a base 22 and at least one arm 24. The base 22 provides a point from which the arm 24 may rotate or otherwise move relatively thereto to perform assigned tasks. The base 22 can be stationary or movable along a programmed travel path 26. A central processing unit (C.P.U.) 28 is integrated into the robot for providing executable instructions including basic task commands to the arm 24 such as welding, sorting, and assembling. The central processing unit 28 may also provide task commands to the base 22 such as moving the robot assembly 20 from a first location 30 to a second location 32 along the programmed travel path 26. A safety control module 34 can be integrated with the central processing unit 28, its own distinct input unit, or an executable software. The functionality of the safety control module 34 is ultimately to avoid collisions with objects while maintaining speed and efficiency, particularly humans and associated work objects like tools, carried work pieces, or drivable machines. At least one sensor 37 transmits a human location 38 to the safety control module 34. While the illustrative embodiments include avoidance of a human location 38, the human location 38 could include the location of another robot, autonomous vehicles, human workers, and other objects. FIG. 1 illustrates the sensor 37 as a device worn or otherwise attached to the human. However, as will be described in more detail below, the sensor or can be a more complicated mechanism which determines the human location 38 from a distance such as a stationary location or from the robot assembly 20. The human location 38 represents the human in a relaxed state, for example, standing upright arms resting against their body. However, based on the human's designated work task, their arms or legs may have to extend outwardly away from their body, or in some cases, the human may need to move an associated work object. These task oriented movements will extend outwardly beyond the human location 38 into a larger safety zone 40 which is outlined by the longest possible extension of the human body or an associated work object beyond the designated human location 38. In one preferred embodiment, the sensors 37 determine the safety zone 40 via object detection. However, the safety zone 40 could also be designated by a pre-determined profile based solely on the human's assigned work task and the human location 38 readings without departing from the subject invention. For example, if a human's assigned task is to move elongated tubes that are 5 ft long from a first location to a second location, the sensor 37 associated with the human will create a safety zone 40 at least 12 ft around the human which represents the largest possible extension, i.e., arms extended holding onto an end of the elongated tube. Regardless of how the safety zone 40 is determined, the safety control module 34 prevents the robot assembly 20 from moving within the safety zone 40. As such, when a human moves until the safety zone 40 overlaps with the robot assembly 20, the central processing unit 28 prevents the robot assembly 20 from moving.

Figure 2B:
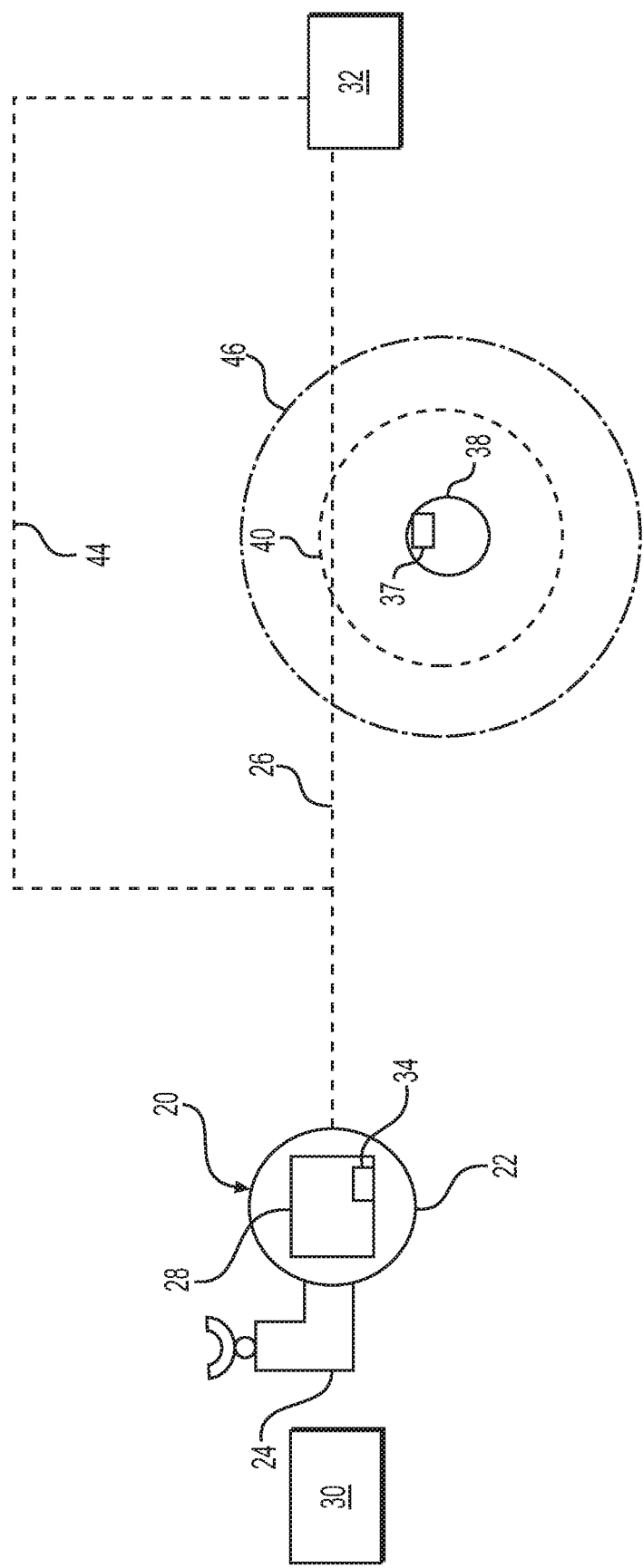
FIG. 2B is a top view illustrating a manufacturing setting wherein the robot assembly with the moveable base determines a blind capture set over an extended time interval.

A robot assembly 20 with a movable base 22 is shown in FIG. 2A. The safety control module 34 is used to determine areas of avoidance. As a function of changes in the human location 38 over a time interval $\Delta T$, the safety control module 34 can determine movement speed and direction of the human location 38 to establish a patterned movement. This is particularly useful when the human task requires movement between different locations, i.e., when the task does not require stationary standing. In such instances, the safety control module 34 creates a capture set 42 based on the movement speed and direction of the human location 38 that represents a calculation of at least one future safety zone 40 location. The capture set 42 thus represents the safety zone 40 as a function of time. The longer the time interval, the more accurate the capture set 42 to determine patterns of human movement. For example, if a human is tasked with moving materials back and forth between location A and location B, the direction and speed of movement of the human location 38 can be combined with the safety zone 40 to determine the capture set 42, i.e., places for the robot assembly 20 to avoid in the future. Stated another way, the capture set 42 is a prediction of future safety zone 40 locations as a function of time based on speed and direction of movement of the human location 38. It should be appreciated that while the capture set 42 is useful for preventing contact between the robot assembly 20 and a human, it is particularly useful for optimizing a program travel path 26 of a robot assembly 20 with a moveable base 22. As such, if a human is moving towards the robot assembly 20, predictive action can be taken such that the robot assembly 20 is moved from a potential safety zone area 40 and can avoid having to completely stop.

Still referring to FIG. 2A, the safety control module 34 or the central processing unit 28 of the robot assembly 20 is programmed with a path execution command to chart the program travel path 26. To this extent, the program travel path 26 is a standard plan for a specific task that moves the robot assembly 20 according to the most efficient path. If a human enters the program travel path 26 and either the base 22 or the arm 24 of the robot assembly 20 breaches the safety zone 40 a stop movement command prevents the robot assembly 20 from continued movement. To avoid instances where the robot assembly 20 has to completely stop movement, the safety control module 34 can further include a path planning and execution command (PPEC) to avoid the capture set 42 and thus increase overall efficiency of movement. The PPEC develops an override movement path 44 based on the capture set 42. Accordingly, any regular or task related movement of the human location 38 between locations over a time interval can be completely avoided. As described above, the capture set 42 is time dependent and can take into account predictions of future movement. The override movement path 44 will continually develop and change based on feedback from changes in the human location 38. For example, as a human approaches a robot assembly 20 the PPEC will use the capture set 42 to command the base 22 of the robot assembly 20 to move to avoid any possibility of collision. Likewise, as the robot assembly 20 moves between the first location 30 and the second location 32, the PPEC of safety control module 34 will dictate the most efficient path of avoidance. If there is not a viable override movement path 44 then the safety control module 34 will command the robot assembly 20 to remain static until the human location 38 has moved far enough away that the robot assembly 20 is no longer in the safe zone 40. In addition, the (C.P.U.) 28 can also send a signal to the human requesting movement from a travel path. In some instance the human movement may be differently than predicted, in such instances the override movement path 44 can change or the robot assembly 20 may automatically or based on efficiency and safety go back to the program travel path 26.

Regardless of whether the robot assembly 20 has or does not have a moveable base 22, the safety control module 34 is additionally programmed with a blind protocol for occurrences when the safety control module 34 cannot pick up readings from the sensor 37. The blind protocol establishes a blind capture set 46 that corresponds to an area in which a safety zone 40 could feasibly move over a period of time. The longer the time that the sensor 37 cannot pick-up a reading, the larger the radius of the blind capture set 46. In operation, when the safety control module 34 stops getting readings from the sensor 37, it initiates the blind protocol and develops a blind capture set 46 that expands as a function of time from the area associated with the last reading of the human location 38. Accordingly, unlike the capture set 42, the blind capture set 46 will usually be circular. The blind capture set 42 can also be determined based on at least one profile data, including an associated work task and previous speed of movement. Based on the blind capture set 46, the robot assembly 20 with a moveable base 22 can change paths to avoid the ever-expanding circumference of the blind capture set 46 or stop movement once enveloped by the blind capture set 46. Once the safety control module 34 develops another reading, the blind capture set 46 is reset.

Figure 2C:
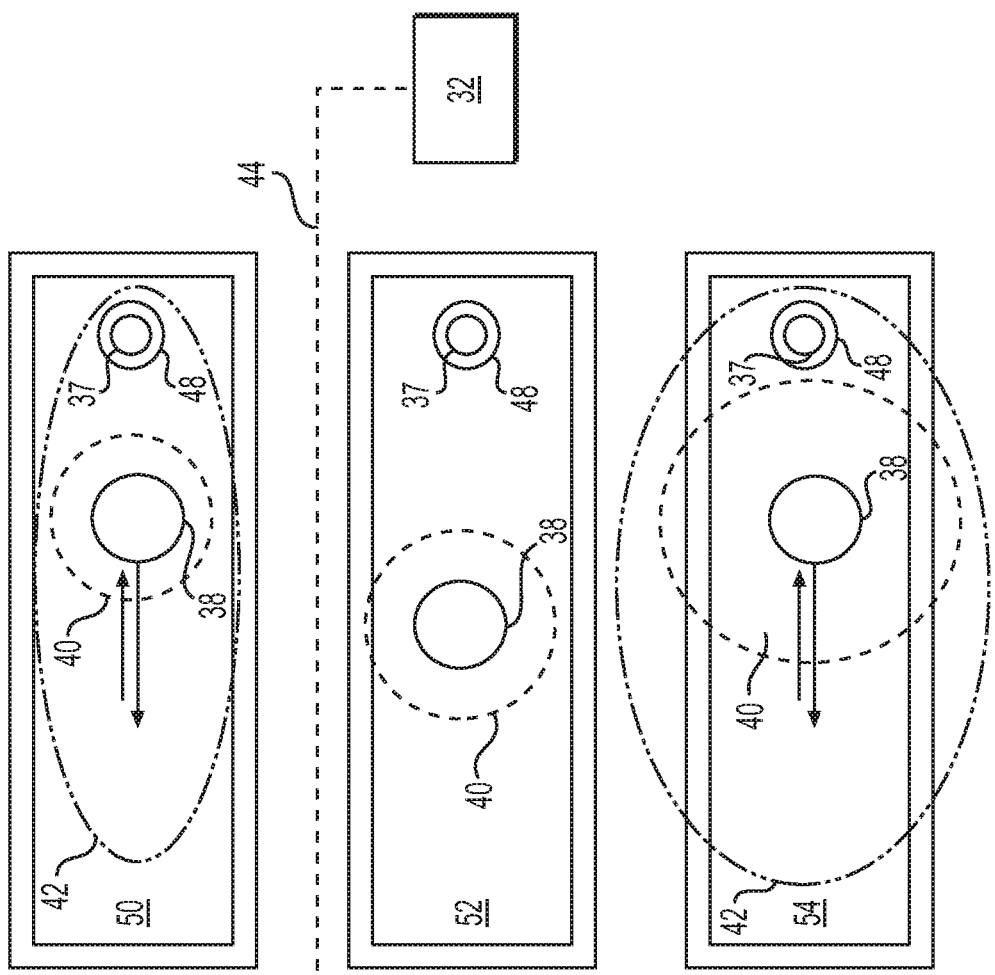
FIG. 2C is a top view of illustrating a manufacturing setting wherein the robot assembly with the moveable base determines the most efficient path of travel based on several capture sets.

Referring now to FIG. 2C, the sensors 37 are not located on humans but instead use object detection technology. As just a few non-limiting examples, the sensor 37 can be one of laser, LED, GPS RF, millimeter wavelength, and ultrasound object detection. The sensor 37 may be located on the robot assembly 20 or at discrete sentry points 48. In embodiments utilizing sentry points 48, readings of human locations within a predefined work zone 50A, 50B, 50C can correspond to specific task profiles. For example, work zone 50A may correspond to a task that requires sorting widgets and require a human to walk back and forth between areas in the work zone 50A. Work zone 50B may correspond to a stationary task, such as inputting data into a computer hub. Work zone 50C may correspond a task that takes up a lot of space, such as movement of large work pieces. The task information is associated with sentry points 48A, 48B, 48C, such that profile data can be used to more accurately develop a capture set 44. While future movement of a human can never be predicted with a hundred percent certainty, this predicted movement or capture set 44 allows the robot to plan a travel path that is statistically going to be the most efficient path possible. As such, in the above noted example, profile data is used to develop a capture set 44 such that C.P.U. 28 can direct the robot assembly 20 via the PPEC between work zones 50A and 50B. If during execution of the travel command, the human workers move outside of the predicted capture set 44, the C.P.U. 28 will either force stopped movement of the robot assembly 20, or initiate an override travel path, which may require backtracking. In another scenario, if the human in work zone 50C is on a break, then the PPEC will instruct the robot assembly 20 to travel under the work zone 50B.

Figure 3:
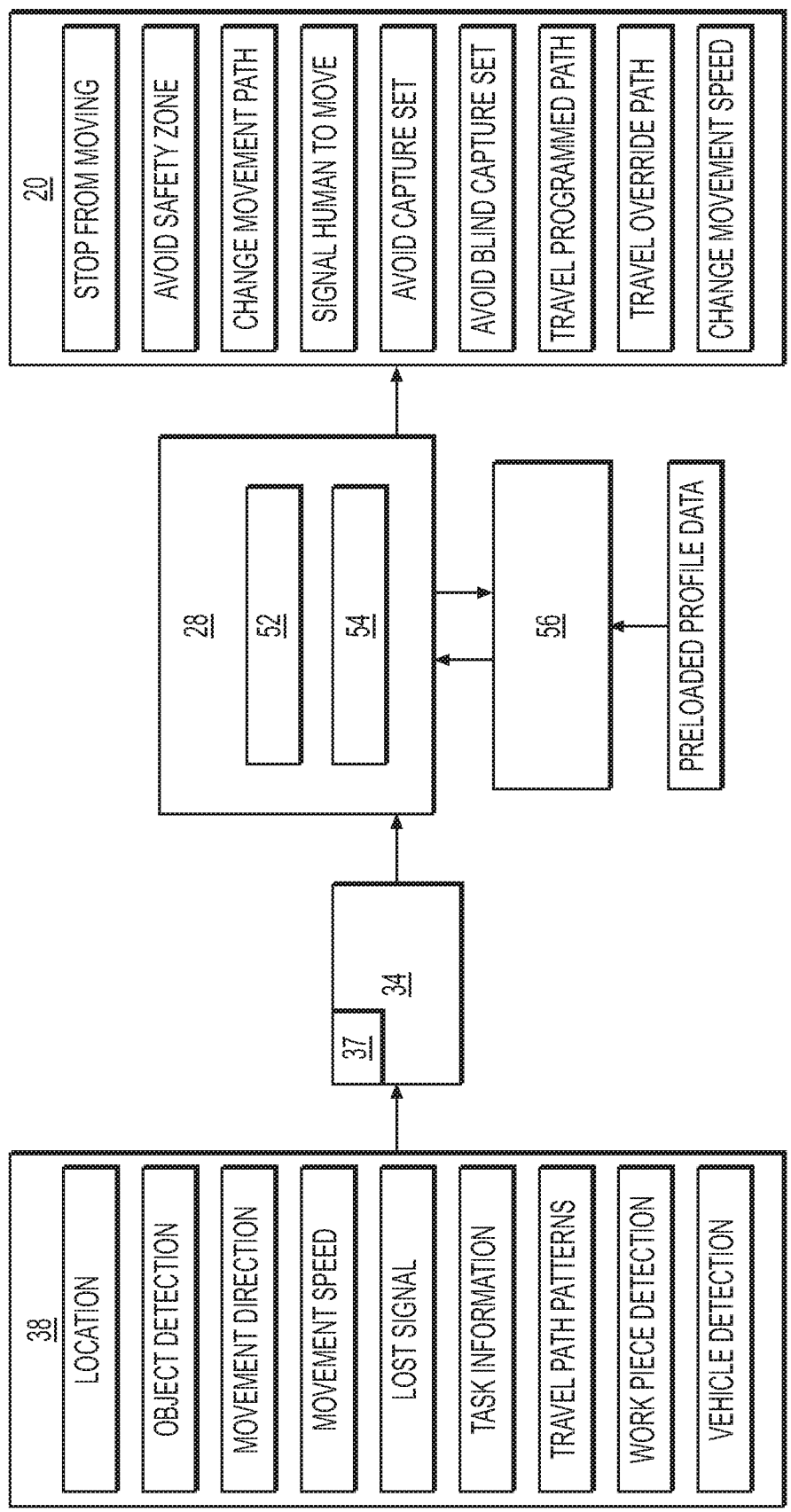
FIG. 3 is a schematic view of a C.P.U. and a safety control module of the robot assembly.
Figure 4:
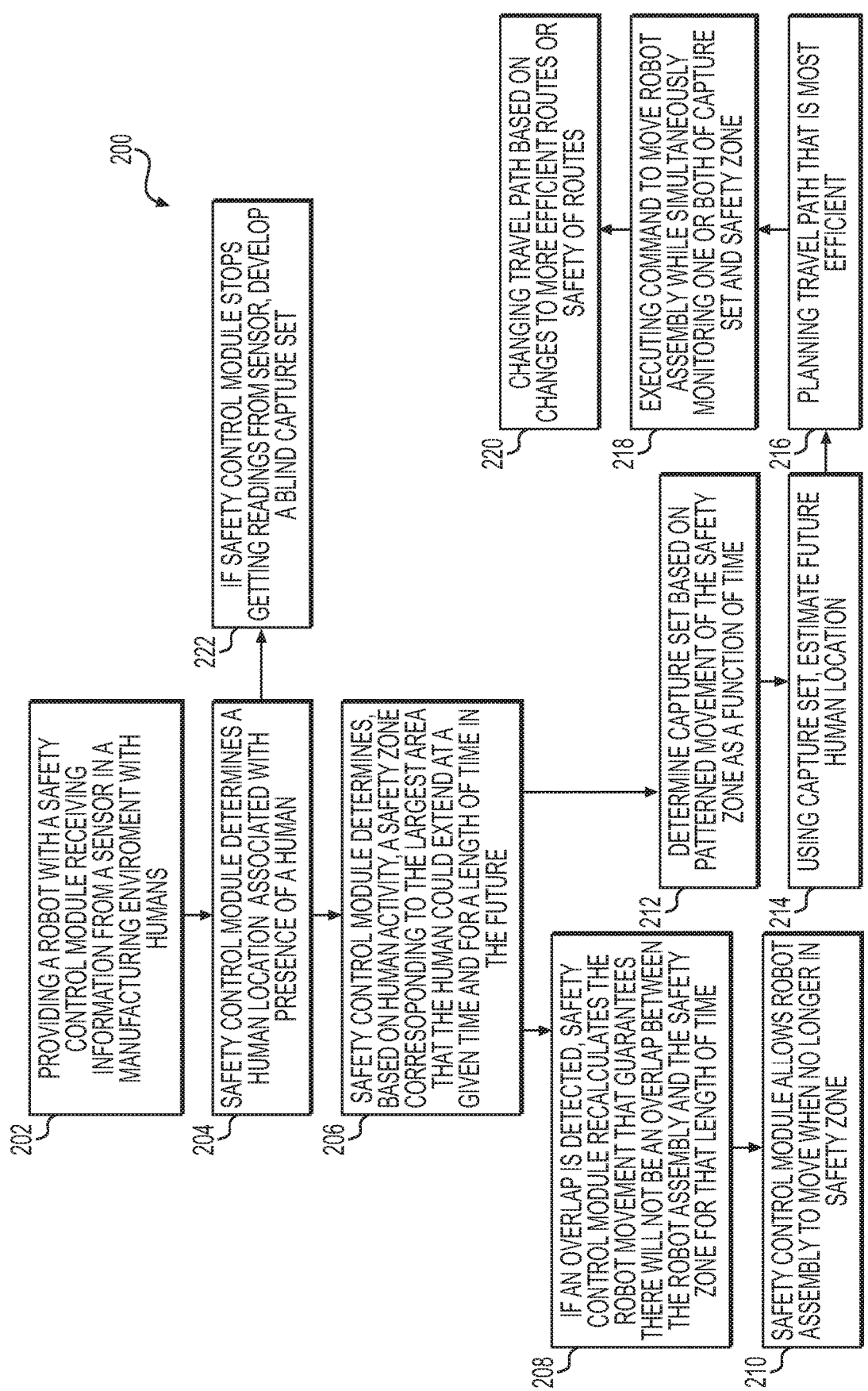
FIG. 4 is a chart illustrating a method of operation of the robot assembly.

With reference now to FIG. 3, the C.P.U. 28 includes a processor 52 and a control unit 54 directing the operation of the processor 52. A memory unit 56 can store data from the sensor 37, the safety control module 34, and pre-downloaded profile data. The processor 52 uses information received from the sensor 37, the safety control module 34, and/or the memory unit 56 to develop the capture set 44 or blind capture set 46 to instruct the robot assembly 20 where and when to move.

It should also be appreciated that the invention provides a method 200 of operation. A robot assembly having a central processing unit with a safety control unit is provided 202. The sensor detects 204 a human location within a predefined area of the robot assembly. Next, based on the human location, the safety control module determines 206 a safety zone corresponding to the largest area of extension of the human or an associated work object. The safety implementation then prevents 208 movement of the robot assembly in the safety zone by either instructing movement elsewhere or making the robot assembly stop moving. When the robot assembly is no longer in the safety zone, the safety control module allows the robot to continue 210 movement required task. If the robot assembly has a moveable base, the safety control module may then capture 212 a series of changes in the human location over an interval of time to develop a capture set. The step of determining the capture set 212 may include accounting for movement speed, direction, and pattern recognition. The pattern recognition may further include incorporating predicted future movements of the human location or pre-determined task oriented profile data. The safety control module and C.P.U. then establish 216 a travel path based on the most efficient route to move the robot assembly between two locations that completely avoids the capture set. The robot assembly is then commanded 218 to travel along the travel path. Continued readings from the safety module allow the travel path to change 220 to a more efficient or safe route based on movement of the safety zone. If the safety control module stops getting location data from a sensor, then the safety control module develops 222 a blind capture set. It should be appreciate that the safety control module may simultaneously develop a plurality of safety zones (safety zone areas) and capture sets (capture set areas) in accordance with the above steps to avoid multiple human workers.

The system, modules, assemblies, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes and modules may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A method for operating a robot assembly to prevent collision with a human in a manufacturing setting comprising:
   providing a robot assembly with a safety control module;
   determining a human location with a sensor;
   determining with the safety control module at least one safety zone area to avoid corresponding to a work task assigned to the human, the at least one safety zone area including a first safety zone area including the area the human or an associated work object could extend when the human is standing in one location and performing the work task;
   preventing the robot assembly from moving within the at least one safety zone area;
   determining a capture set area that includes the first safety zone and a second safety zone that includes a respective area relative to the first safety zone area as a function of time, wherein determining the capture set area includes predicting at least one future location of the second safety zone area based on patterned movement of the second safety zone area as the human travels between locations;
   wherein if a programed movement path of the robot assembly from a first location to a second location intersects the capture set, the method further includes determining an override path to avoid the capture set area to avoid the future location of the human;
   wherein a C.P.U. on the robot assembly instructs the robot assembly to move along the override path until the human has moved away from a potentially overlapping position of the programed movement path; and
   continuously developing the capture set area and changing the override path back to the programed movement path after moving along the override path prior to arriving at the second location if human movement does not move within the at least one future location that has been predicted.

2. The method of claim 1, wherein determining the override path includes determining the most direct route over a predetermined time interval for avoiding the capture set.

3. The method of claim 2, wherein the override path includes speed and direction of travel of the robot assembly.

4. The method of claim 2, including simultaneously developing a plurality of capture set areas for a plurality of human locations and developing an override path that avoids each capture set area.

5. The method of claim 1, wherein assigned work task data corresponding to a specific human or a specific location is stored in a memory unit in communication with the C.P.U. to help develop the capture set area.

6. A method for operating a robot assembly to prevent collision with a human in a manufacturing setting comprising:
   providing a robot assembly with a safety control module;
   determining a human location with a sensor;
   determining with the safety control module at least one safety zone area to avoid corresponding to a work task assigned to the human, the at least one safety zone area including a first safety zone area including the area the human or an associated work object could extend when the human is standing in one location and performing the work task; and
   preventing the robot assembly from moving within the at least one safety zone area;
   wherein in the event the sensor cannot determine the human location and safety zone, including a step of determining with the safety control module a blind capture set corresponding to the largest area the human or associated work object could move as a function of time, and wherein an area of the blind capture set expands with time when the sensor cannot determine the human location and safety zone.

7. The method of claim 6, wherein the robot assembly discontinues movement once the blind capture set overlaps an area in which the robot assembly is in operation.

8. A robot assembly comprising:
   a C.P.U. including one or more computer-readable storage media storing computer-executable instructions being executed by one or more processors;
   a sensor for detecting a human location and human movement;

a safety control module including a human location data and a safety zone data transmitted from the sensor;

the human location data being associated with the human location;

the safety zone data providing a boundary of at least one safety zone area, the at least one safety zone area including a first safety zone area including an area that is associated with the human in a task oriented state that includes a largest possible area in which the human or an associated work object can extend when the human is standing in one location and performing the work task; and wherein the safety zone data causes the processor to avoid moving the robot assembly into the safety zone area;

wherein the C.P.U is configured to;
- determine a capture set area that includes the first safety zone and a second safety zone that includes a respective area relative to the first safety zone area as a function of time, wherein determining the capture set area includes predicting at least one future location of the second safety zone area based on patterned movement of the second safety zone area as the human travels between locations, wherein if a programed movement path of the robot assembly intersects the capture set, the C.P.U. is also configured to determine an override path to avoid the capture set area to avoid the future location of the human;
- instruct the robot assembly to move along the override path until the human has moved away from a potentially overlapping position of the programed movement path; and
- continuously develop the capture set area and changing the override path back to the programed movement path after moving along the override path and prior to arriving at the second location if human movement does not move within the at least one future location that has been predicted.

9. The robot assembly of claim 8, including a moveable base to move the robot assembly between locations and wherein the one or more processors are caused to develop a capture set data based on sensor readings of changes to the safety zone data and the human location data, the capture set data including at least one predicted future second safety zone area location including a respective area relative to the first safety zone area as a function of time, and wherein the executable instructions include developing an override travel path data for the robot assembly that avoids the first and second safety zone areas.

10. The robot assembly of claim 9, wherein the override path data includes instructions for a route of travel and the speed of the robot assembly to travel along the route.

11. The robot assembly of claim 10, wherein the override path data includes the most direct route over a predetermined time interval for avoiding the capture set.

12. The robot assembly of claim 9, wherein the one or more processors are further caused to develop a blind capture set when the sensor cannot determine the human location, the blind capture set including the largest area the human or associated work object could move as a function of time.

13. The robot assembly of claim 12, wherein the blind capture set grows as a function to time when the sensor cannot determine the human location.

14. The robot assembly of claim 13, wherein the blind capture set is circular with a center being the last sensed human location, and wherein a radius of the blind capture set grows as a function to time when the sensor cannot determine the human location.

15. The robot assembly of claim 12, wherein the one or more processors are further caused to discontinue movement of the robot assembly once the blind capture set overlaps an area in which the robot assembly is located.

* * * * *